United States Patent Office 3,142,708
Patented July 28, 1964

3,142,708
METHOD FOR PREPARING α,ω-DIHALOALKANES
John Douglas Young, Lake Jackson, Tex., assignor to The Dow Chemical Company, Midland, Mich., a corporation of Delaware
No Drawing. Filed Aug. 15, 1961, Ser. No. 131,502
3 Claims. (Cl. 260—653.1)

The present invention relates to a novel method for preparing α,ω-dihaloalkanes having the general formula:

$$X(C_2H_4)_nX$$

wherein $n$ represents an integer of at least 2 and X represents a halogen having an atomic number from 9 to 53.

In accordance with the present invention an α,ω-dihaloalkane can be prepared by reacting ethylene with sulfuryl halide in the presence of a free-radical-forming agent such as organic peroxide or any other well known free-radical-forming initiator, including gamma irradiation, at a temperature of from about 100° to 300° C. and a pressure of from 1000 p.s.i.g. to about 30,000 p.s.i.g. for from about 5 seconds to about 10 minutes. Good yields of, for example, 1,4-dihalobutane, are obtained when the reaction is carried out at a temperature of from about 185° to 230° C. at a pressure of from about 6000 to 10,000 p.s.i.g. and the reactants are employed in a ratio of from 1 to 1000 moles of ethylene per mole of sulfuryl halide. The preferred ratios are from 10 to 50 moles of ethylene and from 0.001 to 0.0003 mole of free-radical-forming initiator per mole of sulfuryl halide.

The reaction can be carried out in the presence of a diluent or solvent inert under the conditions of the reaction such as tetrachloroethylene, dichloromethane, 1,2-dichloroethane, trichlorobenzene or the respective fluoro compounds when employing sulfuryl fluoride, sulfuryl iodide or sulfuryl bromide, respectively, to obtain the fluoroalkane, iodoalkane or bromoalkane, respectively.

Various free-radical-forming initiators are useful in effecting the reaction. Some of such include the organic peroxides, i.e. benzoyl peroxide, acetyl peroxide, t.-butyl peroxide, t.-butyl peracetate, t.-butyl perbenzoate, succinnic peroxide, diisopropyl percarbonate and the like, as well as a bisisobutyronitrile, triphenylchloromethane or tetraethyllead. Any source of gamma irradiation may also be used.

The following examples illustrate the present invention but are not to be construed as limiting:

Example 1

Ethylene under 10,000 p.s.i.g. pressure and heated to about 150° C. is introduced simultaneously with a solution of sulfuryl chloride and benzoyl peroxide in methylene chloride or 1,2-dichloroethane cooled to 0° C. into a feed mixer attached to a tubular reactor maintained at about 195° C. by external cooling. Various feed rates and various compositions of the sulfuryl chloride solution of each of the above were employed to obtain different residence times in the reaction and the results are tabulated below:

| | Mole percent in Feed | | | Pressure p.s.i.g. ×10³ | Temp., °C. | Residence Time, Seconds | Mole Percent SO₂Cl₂ Conversion | Products, Mole Percent | | |
|---|---|---|---|---|---|---|---|---|---|---|
| Solvent, Chloride | Reactants | | Catalyst [1] | | | | | Ethylene Chloride | DCB [4] | DCH [5] |
| | Sulfuryl Chloride | Ethylene | | | | | | | | |
| Methylene: | | | | | | | | | | |
| 22.1 | 1.2 | 70.6 | .004 | 2 | 145 | 18 | 5 | 80.6 | 19.4 | |
| 9.8 | 7.7 | 75.9 | .04 | 3 | 150 | 25 | 22 | 87.0 | 12.4 | 0.6 |
| 19.7 | 4.4 | 69.9 | .03 | 3 | 156 | 21 | 95 | 80.6 | 18.5 | 0.8 |
| 12.4 | 2.8 | 78.0 | .02 | 3 | 155 | 23 | 94 | 73.8 | 24.7 | 1.5 |
| 28.8 | 0.7 | 64.9 | .004 | 3 | 145 | 19 | 75 | 45.1 | 50.6 | 4.3 |
| 16.6 | 0.4 | 76.4 | .002 | 3 | 146 | 21 | 65 | 27.7 | 65.3 | 6.9 |
| 20.8 | 5.4 | 67.8 | .03 | 4 | 147 | 21 | 36 | 76.7 | 21.2 | 2.1 |
| 13.0 | 1.1 | 79.0 | .006 | 4 | 155 | 22 | 65 | 40.6 | 56.5 | 2.9 |
| 25.3 | 6.3 | 62.9 | .014 | 4 | 196 | 56 | 74 | 50.4 | 45.8 | 3.7 |
| 17.7 | 11.1 | 65.5 | .005 | 4 | 246 | 50 | 60 | 65.0 | 33.7 | 1.3 |
| Ethylene: | | | | | | | | | | |
| 10.1 | 5.7 | 77.4 | [2].005 | 6 | 185 | 18 | 77 | 72.9 | 25.0 | 2.1 |
| 10.2 | 6.0 | 77.1 | [3].01 | 6 | 171 | 19 | 34 | 75.7 | 23.9 | 0.4 |
| 10.2 | 6.0 | 77.1 | [3].007 | 6 | 196 | 16 | 61 | 71.9 | 27.7 | 0.4 |
| 7.8 | 4.8 | 80.7 | [3].005 | 6 | 227 | 17 | 65 | 50.6 | 46.4 | 2.9 |
| 16.2 | 8.5 | 69.3 | .003 | 8 | 205 | 25 | 75 | 69.6 | 29.0 | 1.4 |
| 16.7 | 8.8 | 68.6 | .002 | 8 | 227 | 24 | 81 | 65.3 | 33.3 | 1.4 |
| 8.8 | 4.6 | 79.7 | .002 | 8 | 216 | 28 | 78 | 52.0 | 45.8 | 2.2 |
| 13.2 | 9.0 | 71.6 | .034 | 10 | 195 | 34 | 65 | 53.4 | 43.9 | 2.7 |
| 13.7 | 9.4 | 70.8 | .004 | 10 | 213 | 35 | 66 | 53.4 | 43.5 | 3.1 |
| 20.6 | 14.0 | 60.1 | .003 | 10 | 228 | 28 | 73 | 64.9 | 33.1 | 2.0 |
| 25.9 | 17.6 | 52.0 | .004 | 10 | 254 | 33 | 68 | 63.6 | 33.5 | 2.9 |
| 23.7 | 12.4 | 58.7 | .004 | 12 | 264 | 35 | 92 | 80.9 | 18.9 | 0.1 |

[1] Benzoyl peroxide except as indicated in footnotes 2 and 3.
[2] Triphenyl chloromethane.
[3] Acetyl peroxide.
[4] Dichlorobutane.
[5] Dichlorohexane.

I claim:
1. A method for preparing α,ω-dihaloalkanes having the general formula

$$X(C_2H_4)_nX$$

wherein $n$ represents an integer from 2 to 10 inclusive, and X represents a halogen having an atomic number from 9 to 53, which comprises reacting ethylene with sulfuryl halide in the presence of a free-radical source at from about 100° to 300° C. and at a pressure of from about 1000 to 30,000 pounds per square inch for from about 5 seconds to about 10 minutes.

2. The method of claim 1 wherein from 1 to 1000 moles of ethylene are employed per mole of sulfuryl halide.

3. The method of claim 1 wherein a peroxide catalyst is employed in an amount of 0.1 to 0.00005 mole per mole of sulfuryl halide.

References Cited in the file of this patent
UNITED STATES PATENTS 2,440,800     Hanford et al. _____ May 4, 1948